(12) United States Patent
Mitani

(10) Patent No.: US 7,346,444 B2
(45) Date of Patent: Mar. 18, 2008

(54) POWER SUPPLY FOR VEHICLE

(75) Inventor: Yohsuke Mitani, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 390 days.

(21) Appl. No.: 10/532,471

(22) PCT Filed: Nov. 9, 2004

(86) PCT No.: PCT/JP2004/016568

§ 371 (c)(1),
(2), (4) Date: Apr. 22, 2005

(87) PCT Pub. No.: WO2005/050811

PCT Pub. Date: Jun. 2, 2005

(65) Prior Publication Data

US 2006/0038442 A1 Feb. 23, 2006

(30) Foreign Application Priority Data

Nov. 20, 2003 (JP) ............................. 2003-390523

(51) Int. Cl.
*B60L 1/00* (2006.01)
(52) U.S. Cl. ........................................ 701/71; 180/117
(58) Field of Classification Search ................. 701/71;
180/117, 203, 165, 6.28, 167; 303/9.63,
303/3, 122, 122.01, 122.04, 124, 132, 133,
303/134
See application file for complete search history.

(56) References Cited

U.S. PATENT DOCUMENTS

| 5,780,980 A | * | 7/1998 | Naito | 318/139 |
| 5,808,448 A | * | 9/1998 | Naito | 322/13 |
| 5,898,282 A | * | 4/1999 | Drozdz et al. | 318/139 |
| 5,951,115 A | * | 9/1999 | Sakai et al. | 303/3 |
| 6,091,228 A | * | 7/2000 | Chady et al. | 320/132 |
| 6,834,737 B2 | * | 12/2004 | Bloxham | 180/165 |

FOREIGN PATENT DOCUMENTS

| JP | 2000-312444 A | 11/2000 |
| JP | 2001-292507 A | 10/2001 |
| JP | 2002-064946 A | 2/2002 |

OTHER PUBLICATIONS

Japanese Search Report for PCT/JP2004/016568, dated Dec. 21, 2004.
English translation of Form PCT/ISA/210.

\* cited by examiner

*Primary Examiner*—Dalena Tran
(74) *Attorney, Agent, or Firm*—RatnerPrestia

(57) ABSTRACT

A capacitor unit used as an auxiliary power source is structured by a plurality of series connected capacitors that have an initial dispersion of characteristics controlled within a predetermined value. During charging, the capacitor unit is monitored if a voltage of the entire capacitor unit is not exceeding a predetermined value. This prevents each capacitor from being charged at a voltage exceeding a withstand voltage.

5 Claims, 3 Drawing Sheets

US 7,346,444 B2

POWER SUPPLY FOR VEHICLE

THIS APPLICATION IS A U.S. NATIONAL PHASE APPLICATION OF PCT INTERNATIONAL APPLICATION PCT/JP2004/016568.

TECHNICAL FIELD

The present invention relates to a power unit for a vehicle that electrically brakes the vehicle.

BACKGROUND ART

In recent years, development of hybrid vehicles and electric vehicles has rapidly been advancing. With this development, instead of the conventional mechanical braking, electrical braking has rapidly been developed.

When a battery is used as a power source for electrically controlling a vehicle, an auxiliary power source, especially one using electric double layer capacitors, is usually incorporated other than the battery against an accidents in which the battery cannot supply power.

In an auxiliary power source using electric double layer capacitors, a plurality of capacitors are connected in series because the withstand voltage of the capacitor is relatively low. When the capacitors connected in series are charged, the voltage of each capacitor is controlled separately so that dispersion in the characteristics of the capacitors does not concentrate voltage only on a specific capacitor and the voltage of each capacitor does not exceed the withstand voltage.

For example, in Japanese Patent Unexamined Publication No. 2001-292507, the voltages of a plurality of capacitors connected in series are controlled separately. However, separately controlling the voltages of respective capacitors poses a problem of a larger scale of a circuit.

SUMMARY OF THE INVENTION

To address the above conventional problem, in the present invention, pre-selected capacitors each having similar characteristics are connected in series, and only controlling the voltage applied to the entire series connection allows respective capacitors to be used at a voltage not exceeding withstand voltage.

To achieve the above objective, a vehicle power unit of the present invention includes: a battery as a power source of a vehicle; an auxiliary power source that has a capacitor unit including a plurality of capacitors and is used in abnormal conditions of the battery; a charge controller for charging the auxiliary power source from the battery; a voltage monitor for monitoring the voltage of the capacitor unit during charging; and an electronic controller for braking the vehicle by supplying power from the battery according to the information from a brake pedal and/or the information on the running state of the vehicle. Said voltage monitor monitors if the voltage of the capacitor unit is not exceeding a predetermined voltage.

REFERENCE MARKS IN THE DRAWINGS

Figure 1:
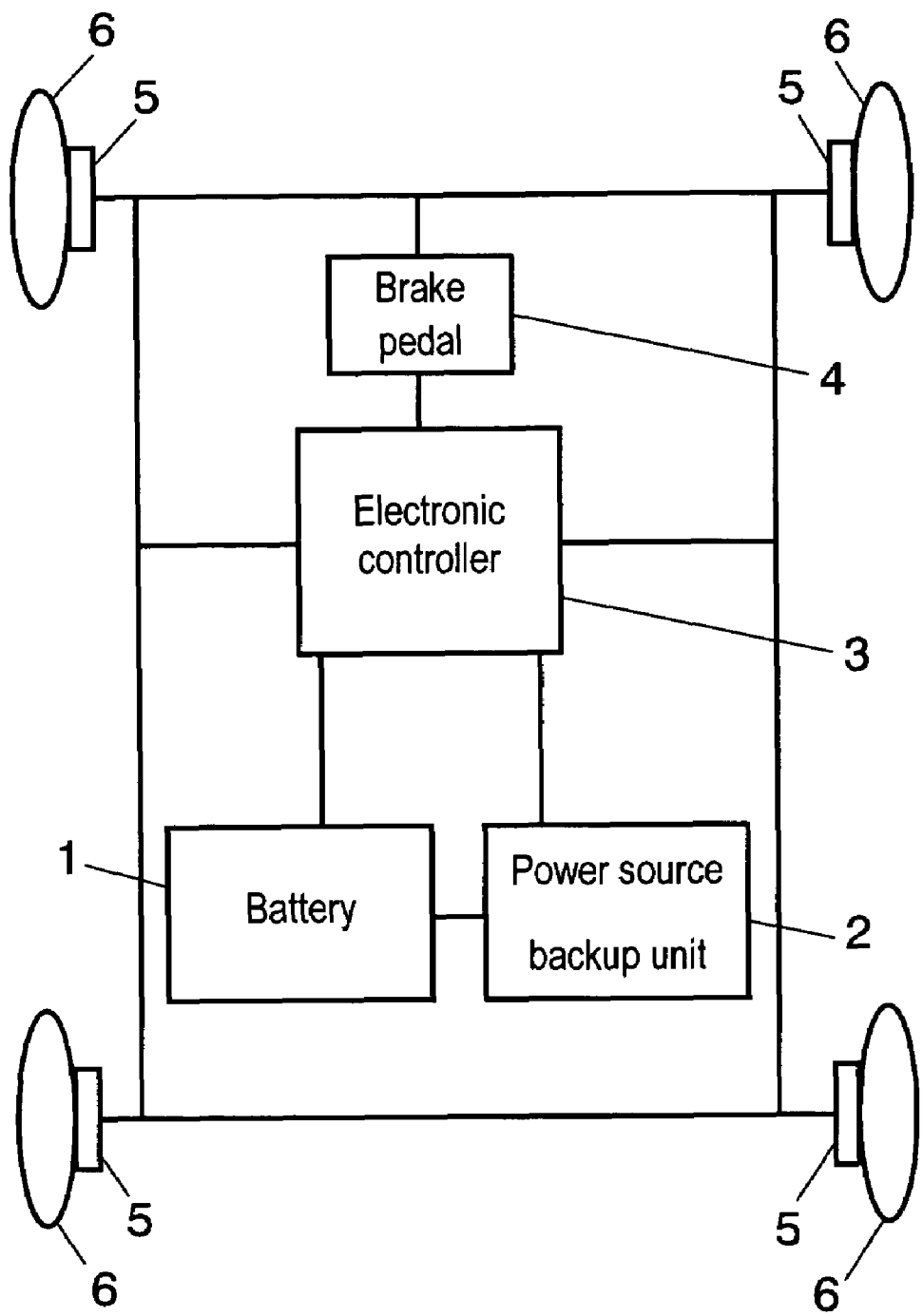
FIG. 1 is a diagram showing a structure of a vehicle power unit in accordance with an exemplary embodiment of the present invention.

1 Battery
2 Power source backup unit
3 Electronic controller
4 Brake pedal
5 Brake
8 Ignition switch
9 IG terminal
14 Microcomputer (voltage monitor)
15 Capacitor unit
16 Charging circuit (charge controller)

DETAILED DESCRIPTION OF PREFERRED EMBODIMENTS

An exemplary embodiment of the present invention is described hereinafter with reference to the accompanying drawings. FIG. 1 is a diagram showing a structure of a vehicle power unit in accordance with the exemplary embodiment of the present invention. Battery 1 supplies a power of 12V to a vehicle. As an auxiliary power source of battery 1, power source backup unit 2 is provided. Electronic controller 3 outputs information for controlling braking of the vehicle. Battery 1 and power source backup unit 2 supply power to electronic controller 3. Brake pedal 4 transmits the information for controlling braking of the vehicle to electronic controller 3. According to the information from brake pedal 4 and/or the information on the running state of the vehicle, electronic controller 3 controls brakes 5 for braking tires 6.

Figure 2:
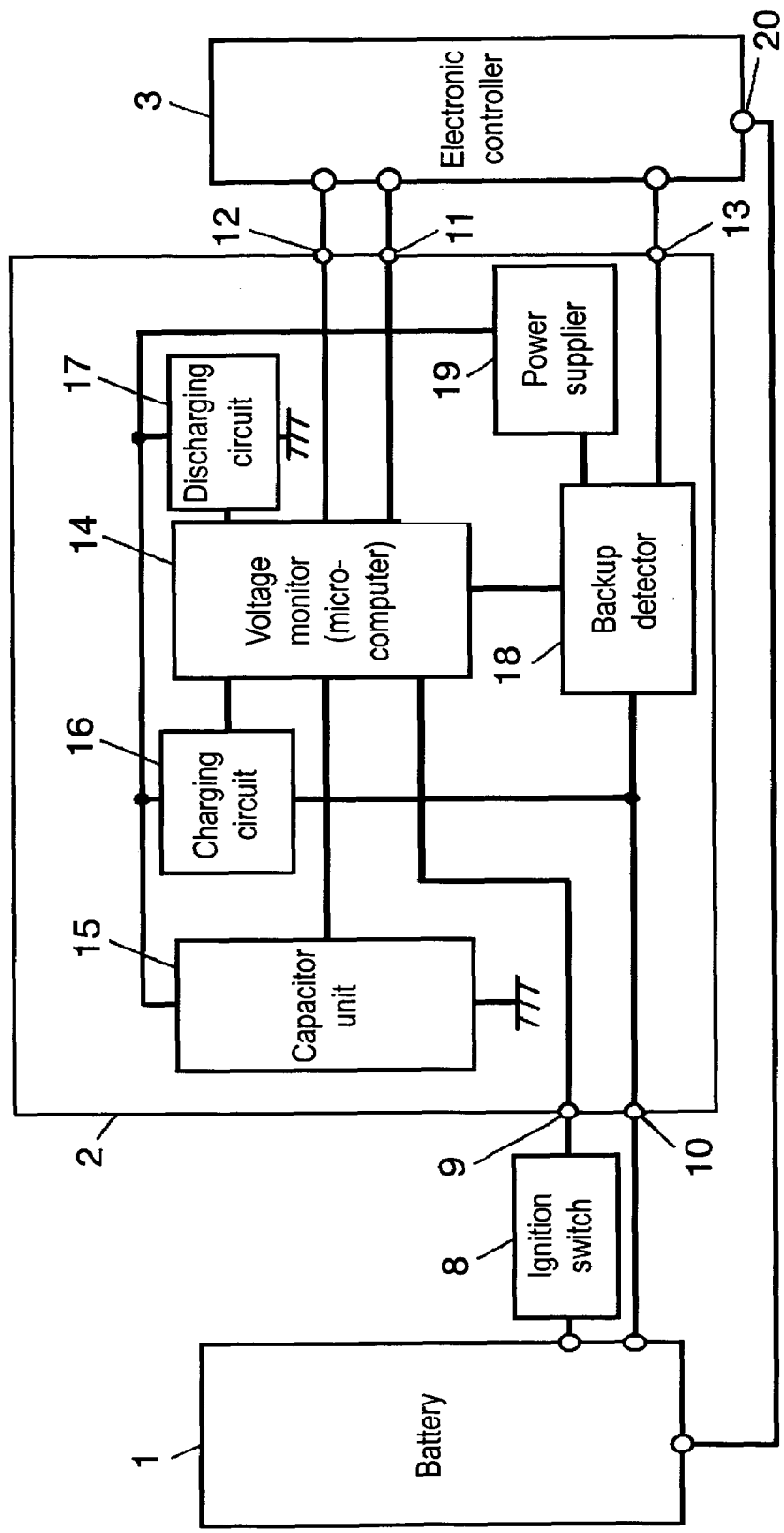
FIG. 2 is a circuit diagram of the vehicle power unit in accordance with the exemplary embodiment.

FIG. 2 is a circuit diagram of the vehicle power unit. Battery 1 is coupled to IG (ignition generator) terminal 9 of power source backup unit 2, via ignition switch 8 for starting or stopping the operation of the vehicle, and is connected to +BC terminal 10 for supplying power to power source backup unit 2. Battery 1 is also connected to power supply terminal 20 of electronic controller 3.

In power source backup unit 2, a signal from electronic controller 3 is fed into communication input terminal 11. From communication output terminal 12, a signal is supplied to electronic controller 3. When an abnormality occurs in battery 1, electric charges accumulated in power source backup unit 2 are supplied from OUT terminal 13 to electronic controller 3.

Capacitor unit 15 is an auxiliary power source for supplying power to brakes 5 via electronic controller 3, in abnormal conditions of battery 1. Capacitor unit 15 is formed of a plurality of electric double layer capacitors capable of being rapidly charged/discharged, for example. Charging circuit 16 charges capacitor unit 15. Discharging circuit 17 discharges capacitor unit 15. Charging circuit 16 and discharging circuit 17 are controlled according to the instructions from microcomputer 14.

Backup detector 18 detects the voltage of battery 1. When voltage abnormality is detected, power supplier 19 operates to supply the electric charges in capacitor unit 15 to electronic controller 3 via OUT terminal 13.

Now, the operation of a vehicle power unit is described. When ignition switch 8 is turned on to start the operation of a vehicle, battery 1 supplies a voltage of 12V to power source backup unit 2 and electronic controller 3. Electronic controller 3 transmits a charging permission signal for permitting to charge capacitor unit 15 to power source backup unit 2, via communication input terminal 11. Microcomputer 14 receives the charging permission signal and transmits it to charging circuit 16. Once charging is permitted, electric charges to be supplied to electronic controller 3 in abnormal conditions of battery 1 are charged in capacitor unit 15 from battery 1, via +BC terminal 10 and charging circuit 16.

Meanwhile, a sensor (not shown) provided in backup detector 18 detects the output voltage of battery 1 and outputs it to OUT terminal 13. When the output voltage of battery 1 is at least a reference value (9.5V), microcomputer 14 confirms that battery 1 and power source backup unit 2 are in normal conditions, and battery 1 continues to supply power to electronic controller 3.

When brake pedal 4 is operated, the information is supplied from brake pedal 4 to electronic controller 3. Responsive to the input information, electronic controller 3 outputs information for controlling a braking of the vehicle to brakes 5. Responsive to this information, brakes 5 brake tires 6.

When ignition switch 8 is turned off to stop the operation of a vehicle, microcomputer 14 transmits a signal for instructing to discharge the electric charges accumulated in capacitor unit 15 to discharging circuit 17. Responsive to this signal, discharging circuit 17 discharges the electric charges accumulated in capacitor unit 15.

Next, the operation of the vehicle power unit in abnormal conditions of battery 1 is described. When the output voltage of battery 1 is lower than a reference value (9.5V), backup detector 18 detects that battery 1 is in abnormal conditions.

Responsive to this information on detection of abnormality, power supplier 19, which is turned off in normal conditions of battery 1, is turned on. Thus, the electric charges can be discharged from capacitor unit 15 to OUT terminal 13. At the same time, power supply from battery 1 stops. Backup detector 18 transmits a signal for instructing to discharge the electric charges accumulated in capacitor unit 15 to microcomputer 14. By this instruction, electric charges accumulated in capacitor unit 15 are supplied to OUT terminal 13 and then to electronic controller 3 via power supplier 19.

Microcomputer 14 transmits a signal for informing the abnormality of battery 1 to electronic controller 3, via communication output terminal 12. Electronic controller 3 displays the abnormal of battery 1 inside of the vehicle, and instructs the driver to stop the vehicle immediately. Because the electric charges accumulated in capacitor unit 15 are supplied to electronic controller 3, the driver can operate brakes 5 using brake pedal 4. Thus, the vehicle can stop safely.

Figure 3:
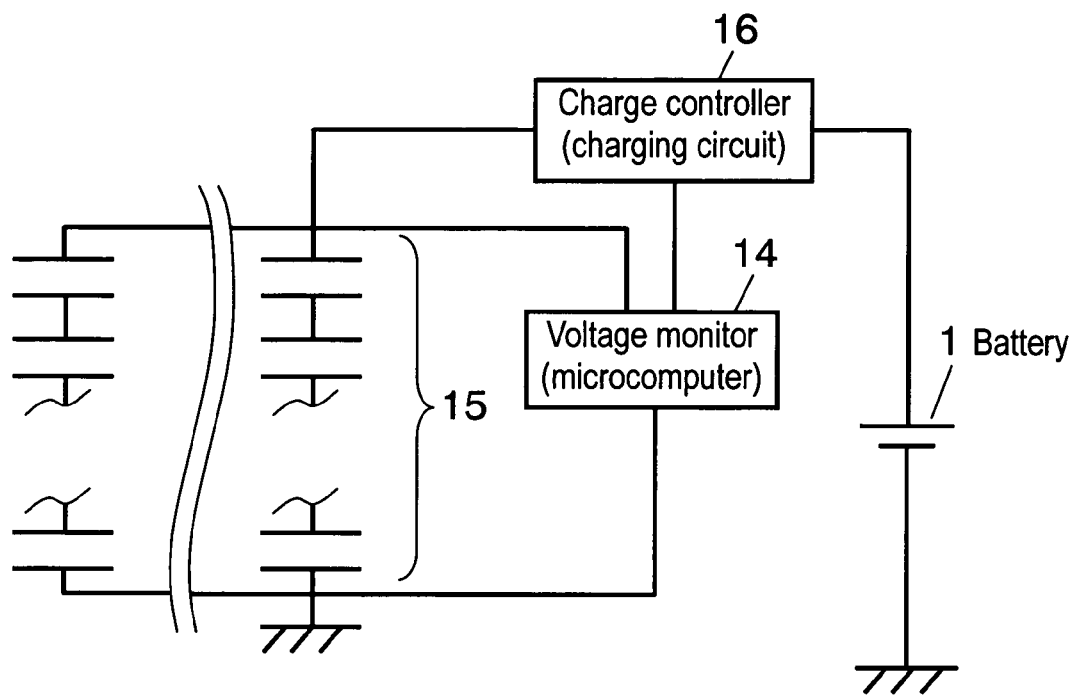
FIG. 3 is a circuit diagram of a capacitor unit in accordance with the exemplary embodiment.

Now, charging a capacitor unit is described. FIG. 3 is a circuit diagram of capacitor unit 15. As shown in FIG. 3, a plurality of capacitors are connected in series to form a series stage, and a plurality of said series stages are connected in parallel to form a capacitor unit. Each of the capacitors is referred to as a capacitor cell hereinafter.

As an example, a description is provided of charging a capacitor unit in which seven capacitor cells each having a withstand voltage of 2.1V are connected in series. Suppose that the necessary minimum charging voltage is 12.8V, which is the same as that of a battery used in the ordinary vehicle. If the capacitor cells have no dispersion in the characteristics thereof, the withstand voltage of the capacitor unit is 2.1V×7=14.7V. Thus, microcomputer 14, i.e. a voltage monitor, may monitor if the voltage of the capacitor unit is not exceeding 14.7 V during charging. However, actual capacitor cells may have dispersion in the characteristics thereof. For this reason, when the capacitor unit is charged to 14.7V, any one of the capacitor cells will be charged to a withstand voltage of 2.1V or higher.

Then, the voltage to be monitored during charging is obtained under the following conditions, when the aged deterioration of the voltages of capacitor cells is ±2% and the initial dispersion in the capacitor cells is ±3%.

(1) The full withstand voltage of 2.1V is applied to one capacitor cell having a dispersion of +5%.

(2) The remaining six capacitor cells have a dispersion of −5%.

Under these conditions, voltage V0 to be monitored is obtained by Equation 1, when the withstand voltage of each capacitor cell is V1, the initial dispersion in the capacitor cells is Fdeg, the aged deterioration of the capacitor cells is Adeg, and number of the capacitor cells connected in series is T.

$$V0 = V1 + \frac{1 - (Fdeg + Adeg)}{1 + (Fdeg + Adeg)} \times V1 \times (T - 1) \qquad \text{Equation 1}$$

Now, V1=2.1, Fdeg=0.03, Adeg=0.02, and T=7. These values are substituted in Equation 1 to obtain V0=13.5V.

In other words, microcomputer 14 may monitor if the voltage of the capacitor unit during charging is not exceeding 13.5 V. In this state, the capacitor unit can be charged without a voltage lager than 2.1 V applied to any one of the capacitor cells. When the voltage of the capacitor unit exceeds 13.5 V, microcomputer 14 stops charging and displays abnormality of capacitor cells.

Figure 4:
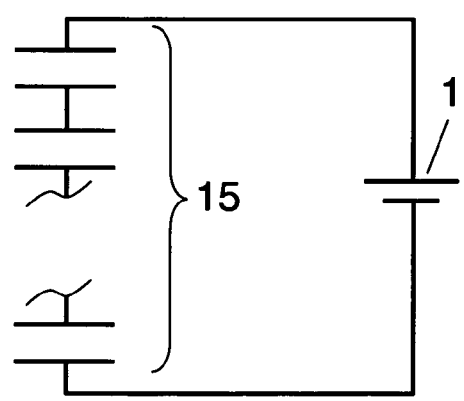
FIG. 4 shows a circuit for selecting capacitor cells in accordance with the exemplary embodiment.

Now, how to select initial dispersion in capacitor cells is described. FIG. 4 shows a circuit for selecting capacitor cells in accordance with the exemplary embodiment. To ensure that the initial dispersion in the capacitor cells is within ±3%, the capacitor cells are selected in the following manner.

When seven capacitor cells connected in series are charged, the case where any one of the capacitor cells exceeds the withstand voltage thereof at the minimum charging voltage is a combination where only one capacitor cell having a dispersion of +3% is 2.1V and the other six capacitor cells have a dispersion of −3%. In this case, the voltage applied to the capacitor cells having a dispersion of −3% is 2.1×0.97÷1.03=1.978V, and the voltage applied to the seven capacitor cells connected in series is 2.1+1.978×6=13.966V.

Therefore, when the seven capacitor cells connected in series is charged at a voltage of 13.966V and the voltage per capacitor cell ranges from 1.978 to 2.1V, it can be ensured that the initial dispersion in respective capacitor cells is within ±3%.

When a capacitor unit is structured of capacitor cells selected in this manner, only controlling the voltage of capacitor unit 15 not to exceed 13.5 V can ensure that a voltage exceeding the withstand voltage is not applied to any capacitor cell, without monitoring the voltage applied to each capacitor separately. This can prevent deterioration of a capacitor life, using a small scale of a circuit.

INDUSTRIAL APPLICABILITY

A vehicle power unit of the present invention can prevent deterioration of a capacitor life, using a small scale of a circuit. For this reason, the vehicle power unit can widely be used for electric vehicles, fuel cell powered vehicles, and hybrid vehicles, as a maintenance-free auxiliary power source instantaneously providing high output.

The invention claimed is:

1. A vehicle power unit capable of electrically controlling a brake of a vehicle having a battery as a power source of the vehicle, the vehicle power unit comprising:
   an auxiliary power source having a capacitor unit and used in abnormal conditions of the battery, the capacitor unit comprising a plurality of capacitor cells;
   a charge controller for charging the auxiliary power source from the battery;
   a voltage monitor for monitoring a voltage of the capacitor unit during charging; and
   a electronic controller for braking the vehicle by supplying power from the battery to the brake according to at least one of information from a brake pedal and information on a running state of the vehicle;
   wherein:
   the voltage monitor monitors whether the voltage of the entire capacitor unit exceeds a predetermined voltage, when the voltage monitor detects that the voltage exceeding the predetermined voltage is applied to the capacitor unit during charging, the voltage monitor determines an abnormality, and the charge controller stops charging,
   a voltage V0, which is the predetermined voltage that the voltage monitor determines as the abnormality, is calculated by the following Equation:

$$V0 = V1 + \frac{1 - (F\,deg + A\,deg)}{1 + (F\,deg + A\,deg)} \times V1 \times (T - 1)$$

wherein V1 is a withstand voltage of each capacitor cell, Fdeg is an initial dispersion in the capacitor cells, Adeg is an aged deterioration of the capacitor cells, and T is the number of the capacitor cells connected in series.

2. A vehicle power unit capable of electrically controlling a brake of a vehicle which includes a battery as a power source of the vehicle, the vehicle power unit comprising:
   an auxiliary power source having a capacitor unit and used in abnormal conditions of the battery, the capacitor unit comprising a plurality of capacitor cells;
   a charge controller for charging the auxiliary power source from the battery;
   a voltage monitor for monitoring a voltage of the capacitor unit during charging; and
   a electronic controller for braking the vehicle by supplying power from the battery to the brake according to at least one of information from a brake pedal and information on a running state of the vehicle, wherein the capacitor cell is previously confirmed that an initial dispersion of voltage between cells is within a predetermined value.

3. The vehicle power unit of claim 2, wherein the plurality of capacitor cells connected in series are charged at a further predetermined voltage, and the initial dispersion of respective capacitor cells is selected from the charging voltage of the respective capacitor cells.

4. A vehicle power unit capable of electrically controlling a brake of a vehicle having a battery as a power source of the vehicle, the vehicle power unit comprising:
   an auxiliary power source having a capacitor unit and used in abnormal conditions of the battery, the capacitor unit comprising a plurality of capacitor cells;
   a charge controller for charging the auxiliary power source from the battery;
   a voltage monitor for monitoring a voltage of the capacitor unit during charging; and
   a electronic controller for braking the vehicle by supplying power from the battery to the brake according to at least one of information from a brake pedal and information on a running state of the vehicle, wherein the capacitor cell is previously confirmed that an initial dispersion of voltage between cells is within a predetermined value, wherein:
   the plurality of capacitor cells connected in series are charged at a further predetermined voltage, and the initial dispersion of respective capacitor cells is selected from the charging voltage of the respective capacitor cells,
   a voltage V0 to be applied to the plurality of capacitor cells connected in series to select the initial dispersion in the capacitor cells is calculated by the following Equation:

$$V0 = V1 + V1 \times \frac{1 - F\,deg}{1 + F\,deg} \times (T - 1)$$

where V1 is a withstand voltage of each capacitor cell, Fdeg is an initial dispersion in the capacitor cells, and T is the number of the capacitor cells connected in series.

5. A vehicle power unit, wherein a plurality of capacitor cells connected in series are charged at the applied voltage of claim 4, and a voltage of each capacitor cell is monitored to structure a capacitor unit by a combination in which no capacitor cell has a voltage V2 higher than the withstand voltage V1 and lower than the following Equation:

$$V1 \times \frac{1 - F\,deg}{1 + F\,deg}.$$

* * * * *

UNITED STATES PATENT AND TRADEMARK OFFICE
CERTIFICATE OF CORRECTION

PATENT NO. : 7,346,444 B2
APPLICATION NO. : 10/532471
DATED : March 18, 2008
INVENTOR(S) : Yohsuke Mitani Page 1 of 1

It is certified that error appears in the above-identified patent and that said Letters Patent is hereby corrected as shown below:

At Column 5, line 35, " $V0 = V1 + \dfrac{1-(F\deg + A\deg)}{1+(F\deg + A\deg)} \times V1 \times (T-1)$ ,, should read -- $V0 = V1 + \left[\dfrac{1-(F\deg + A\deg)}{1+(F\deg + A\deg)}\right] \times V1 \times (T-1)$ --

Signed and Sealed this

Twenty-second Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,346,444 B2 Page 1 of 1
APPLICATION NO. : 10/532471
DATED : March 18, 2008
INVENTOR(S) : Yohsuke Mitani It is certified that error appears in the above-identified patent and that said Letters Patent is hereby corrected as shown below:

At Column 5, line 35, "
$$V0 = V1 + \frac{1-(F\deg + A\deg)}{1+(F\deg + A\deg)} \times V1 \times (T-1)$$
"

should read --
$$V0 = V1 + \left[\frac{1-(F\deg + A\deg)}{1+(F\deg + A\deg)}\right] \times V1 \times (T-1)$$
--

Signed and Sealed this

Fifth Day of August, 2008

JON W. DUDAS
*Director of the United States Patent and Trademark Office*